D. L. HOLDEN.
Apparatus for Curing Meat.

No. 207,277. Patented Aug. 20, 1878.

WITNESSES:
W. W. Hollingsworth
Edw. W. Byrn

INVENTOR:
D. L. Holden
BY
ATTORNEYS.

UNITED STATES PATENT OFFICE.

DANIEL L. HOLDEN, OF PHILADELPHIA, PENNSYLVANIA.

IMPROVEMENT IN APPARATUS FOR CURING MEAT.

Specification forming part of Letters Patent No. 207,277, dated August 20, 1878; application filed May 13, 1878.

*To all whom it may concern:*

Be it known that I, DANIEL L. HOLDEN, of the city and county of Philadelphia, and State of Pennsylvania, have invented a new and Improved Apparatus for Preserving Meats; and I do hereby declare that the following is a full, clear, and exact description of the same, reference being had to the accompanying drawing, forming part of this specification, in which—

Figure 1:
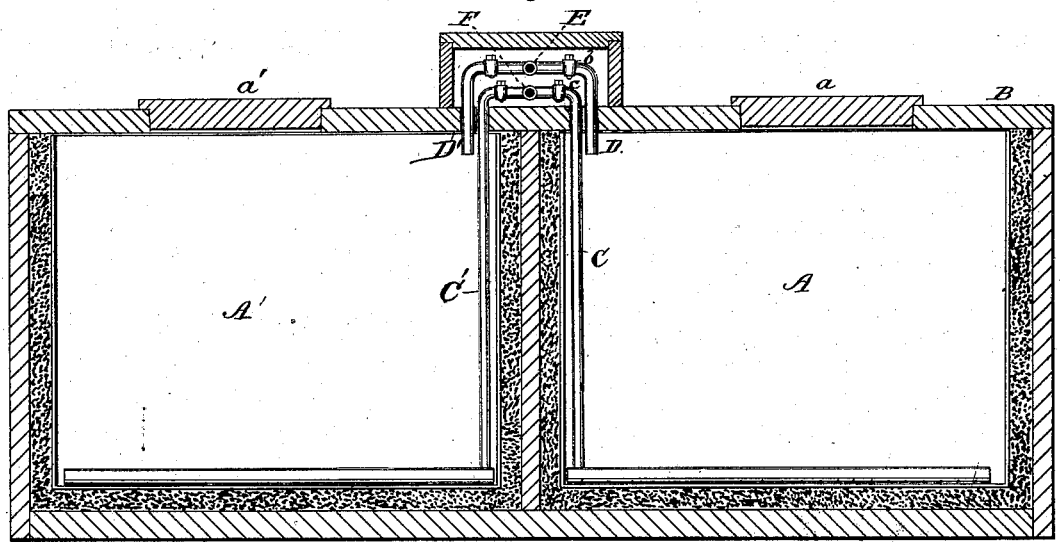
Figure 2:
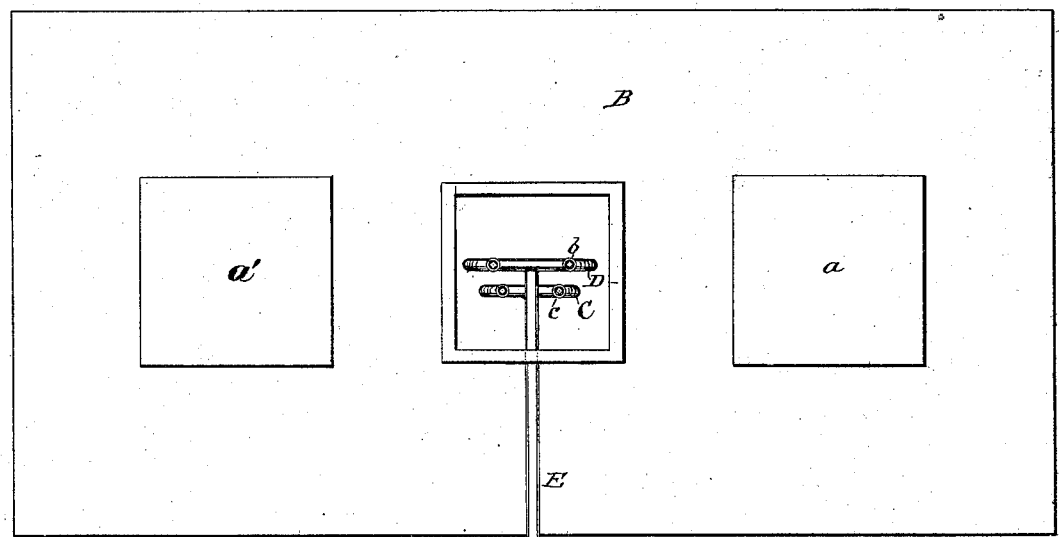

Figure 1 is a vertical longitudinal section through two of a series of tanks. Fig. 2 is a plan view.

My invention relates to the curing of meat by a circulating current of refrigerated pickle; and it consists in the improved arrangement of pipes and tanks for securing an economy of time and labor in the manipulation of the meat and pickle, as hereinafter more fully described.

In the drawing, A A' represent two of a series of tanks insulated with a packing of some poor conductor of heat arranged between the double walls of said tanks. B is a cover to the tanks, having hatches $a$ $a'$ for the admission of the packer and the beef which is to be packed. C D are pipes, one of which, C, descends to the bottom of the tank and opens through a perforated branch into the bottom of the tank, while D opens into the top of the tank. These pipes are provided with valves $b$ $c$, through which they connect with the main pipes E F, which extend along a series of these tanks and connect with other pipes corresponding to C D. Into these tanks the beef is packed and then weighted or held down by suitable means to prevent it from floating. In securing the circulation of the brine or pickle the pipe E, communicating with pipe D, which opens in the top of the tank, is connected with the exhaust side of a pump, (not shown,) the discharge side of which pump connects with an ice-machine refrigerator, (not shown,) and the discharge side of which ice-machine refrigerator connects with the other pipe, F, having communication with the pipe C, which opens into the bottom of the tank through the perforated branch pipe. Now, the pumps being set in motion, it will be seen that the brine or pickle is exhausted from the top of the tank and forced by the pump through the ice-machine, where its temperature is reduced to about or a little above the freezing-point, and the cold current of brine is then driven into the bottom of the tank, where it simultaneously absorbs and extracts the animal heat and renders the meat antiseptic.

When the meat has been thoroughly cured, and it is desired to remove it from the tank, the direction of the current of the pickle through the pipes C and D is changed by means of a four-way cock which I employ, (but which is not shown,) and the pipe opening into the bottom of the tank exhausts the latter of its pickle, which is delivered by adjusting the valves in the pipe into the next tank.

In pointing out my invention more clearly, I do not claim, broadly, a tank having one pipe opening into the bottom of the same and another opening into the top, as this presents no substantial novelty. It will be seen, however, that I have my tanks arranged in pairs, which pairs are to be arranged in series, as described. Now, by giving to the pipes E and F two sets of branches, one set of which, D and C, open into one tank, and the other set, D' and C', of which open into the other tank of the pair, it will be seen that the pickle may be circulating in one tank, A, to cure the meat therein while the packers are at work in the other, A'. Now, when the meat in A is cured, the pickle is drawn out of this one through pipe C and is admitted to A' through C', in which latter tank the circulation is kept up by pipes C' and D' without delay, leaving the meat in A accessible, so as to be easily removed.

Having thus described my invention, what I claim as new is—

The combination of the tanks A A', the pipe E, having branch pipes D D', opening into the tops of the two tanks by means of cocks or valves, and the pipe F, having branch pipes C C', opening by means of through valves or cocks into the bottom of said tanks, substantially as and for the purpose described.

D. L. HOLDEN.

Witnesses:
 SOLON C. KEMON,
 EDW. W. BYRN.